United States Patent
Berrange (10) Patent No.: US 9,977,667 B2
(45) Date of Patent: May 22, 2018

(54) UPDATING SOFTWARE UTILIZING DOMAIN NAME SYSTEM (DNS)

(71) Applicant: Red Hat, Inc., Raleigh, NC (US)

(72) Inventor: Daniel Berrange, Yokneam Illit (IL)

(73) Assignee: Red Hat, Inc., Raleigh, NC (US)

( * ) Notice: Subject to any disclaimer, the term of this patent is extended or adjusted under 35 U.S.C. 154(b) by 84 days.

(21) Appl. No.: 14/849,272

(22) Filed: Sep. 9, 2015

(65) Prior Publication Data

US 2017/0068530 A1    Mar. 9, 2017

(51) Int. Cl.
| | |
|---|---|
| *G06F 9/445* | (2006.01) |
| *H04L 29/12* | (2006.01) |
| *G06F 9/44* | (2018.01) |
| *G06Q 10/10* | (2012.01) |
| *H04L 29/08* | (2006.01) |
| *H04L 29/06* | (2006.01) |
| *G06F 17/30* | (2006.01) |

(52) U.S. Cl.
CPC .................. *G06F 8/65* (2013.01); *G06F 8/71* (2013.01); *H04L 61/1511* (2013.01); *H04L 63/126* (2013.01); *H04L 67/34* (2013.01); *G06F 17/30309* (2013.01); *G06F 17/30377* (2013.01); *G06Q 10/10* (2013.01); *H04L 67/10* (2013.01); *H04L 67/125* (2013.01); *H04L 67/42* (2013.01)

(58) Field of Classification Search
CPC .................. G06F 8/65; G06F 17/30309; G06F 17/30377; G06F 8/71; H04L 61/1511; H04L 67/10; H04L 67/42; H04L 67/125; H04L 67/34; H04L 63/126; G06Q 10/10

USPC .......................................................... 717/170
See application file for complete search history.

(56) References Cited

U.S. PATENT DOCUMENTS

| | | | |
|---|---|---|---|
| 6,169,204 B1 | 3/2001 | Donohue | |
| 8,843,643 B2 * | 9/2014 | Larson | H04L 29/12066 709/227 |
| 8,964,761 B2 | 2/2015 | Shin et al. | |
| 8,977,728 B1 | 3/2015 | Martini | |
| 9,003,387 B2 | 4/2015 | Van Camp et al. | |
| 2003/0097564 A1 * | 5/2003 | Tewari | H04L 12/14 713/171 |
| 2012/0203864 A1 | 8/2012 | Toth et al. | |
| 2014/0173111 A1 | 6/2014 | Varner | |
| 2014/0181321 A1 * | 6/2014 | Brzozowski | H04L 29/06047 709/245 |
| 2016/0308819 A1 * | 10/2016 | Gupta | H04L 61/1511 |

OTHER PUBLICATIONS

Create a Transparent Local Software Update Server, Oct. 10, 2007, obtained from http://hints.macworld.com/article.php?story=20071009082248452 (8 pages).

(Continued)

*Primary Examiner* — Qing Chen
*Assistant Examiner* — Mohammed Huda
(74) *Attorney, Agent, or Firm* — K&L Gates LLP (57) ABSTRACT

Examples described herein are directed to systems and methods for updating software. An update system may generate a first Domain Name System (DNS) record comprising first version data indicating a version of an update to the software. The update system may send the DNS record to a DNS server with an indication of a domain name associated with the software.

14 Claims, 5 Drawing Sheets

(56) References Cited

OTHER PUBLICATIONS

DNS Processes and Interactions, Nov. 25, 2012, obtained from https://technet.microsoft.com/en-us/library/dd197552(v=ws.10).aspx (21 pages).

How the Windows Update Client Determines Which Proxy Server to Use to Connect to the Windows Update Web Site, obtained from https://support.microsoft.com/en-us/kb/900935 (7 pages).

Update Client FAQs, obtained from http://dyn.com/apps/update-client-faqs (7 pages).

* cited by examiner

UPDATING SOFTWARE UTILIZING DOMAIN NAME SYSTEM (DNS)

BACKGROUND

Modern software is often updated after its initial release. Oftentimes, patches or other updates are downloaded from a server or other network-accessible source. Sometimes, a user manually downloads an update For example, the user of a software application can manually download a patch or other update. In other cases, a computer device is programmed to automatically query a source for updates. If a new update is available, the computer device downloads that update from the source. There is a need for improved systems and methods to identify and download new patches.

SUMMARY

Various examples are directed to systems and methods for updating software. For example, an update system may generate a first Domain Name System (DNS) record comprising first version data indicating a version of a first update to the software. The update system may send the DNS record to a DNS server with an indication of a domain name associated with the software. For example, the domain name may be associated with a company or other entity that maintains the software and/or distributes updates for the software. A client system may send a DNS query comprising data indicating a domain name associated with the first software update. In response to the DNS query, the client system may receive the DNS record. The client system may determine that the first version data is not equivalent to second version data stored at the client system, where the second version data indicates a second version of the first update to the software at the client system. The client system may send to the update system a request for the first update to the software; and receive first version of the first update to the software.

Some examples described herein are directed to a systems and methods for updating a database. An update system may generate a resource record comprising first version data indicating a first version of an update to the database available at the update system. The update system may write the resource record to a zone file corresponding to a domain name. The update system may also write to the zone file time-to-live data for the resource record, where the time-to-live data indicates a valid time period for the resource record. The update system may send the zone file to a DNS server. A client system may execute a DNS client and send to the DNS client a DNS query comprising domain name data indicating the domain name. In response to the DNS query, the client system may receive the zone file from the DNS client. The client system may determine that the valid time period indicated by the time-to-live data from the zone file has not expired and determine that the first version data does not match client version data indicating a current client update to the software. The client system may send to the update system a request for the first version of the first update to the database.

FIGURES

Various examples are described herein in conjunction with the following figures, wherein.

DESCRIPTION

Various examples are directed to systems and methods for updating software using a Domain Name System (DNS). One or more client systems may utilize updatable software, which may include, for example, applications, databases, etc. A client system may receive updates to the software from an update system. An update may include a new version of the software, a patch to be applied to the software, a new dynamically-linked library (DLL) or other resource for the software, etc. When a new version of an update to the software is available at the update system, client systems may download the new version of the update from the update system. The update system and client systems may utilize DNS to communicate when a new version of an update is available. For example, an update may be associated with a domain name. The update system may create a DNS record for the update. The DNS record for an update may include version data indicating a version of the update available for download at the update system. The DNS record may be provided to a DNS system comprising one or more DNS servers. When a new version of the update becomes available at the update system, the update system may create a new DNS record associated with the domain name and including new version data indicating the new version of the update. The update system may send the new DNS record to the DNS system.

Client systems may determine whether a new version of the update is available by querying the DNS system. A client system may periodically query the DNS system to determine whether the version of the update available for download at the update system is different than a version of the update at the client system. Upon receiving the DNS record, the client system may extract the version data and compare it to client version data indicating a version of the update at the client system. If the version data from the DNS record matches the client version data, it may indicate that the client system already has the version of the update stored at the update system. On the other hand, if the version data from the DNS record does not match the client version data, it may indicate that the client system does not have the version of the update available at the update system. The client system may then download, or request to download the version of the update available at the update system. Because DNS is used to communicate the availability (or unavailability) of a new version of the update, client systems may not need to repeatedly query the update system regarding the availability of new updates. In this way, queries to the update system may be reduced. This may reduce the load on the update system and can reduce hardware requirements for the update system.

The examples described herein may be used to provide any suitable type of update to any suitable type of updatable software. In some examples, the software includes software applications, such as operating systems, word processors, spreadsheets, etc. Updates to an application may include complete new versions of the application, patches for updating the application, new objects, such as dynamically linked libraries (DLLs), for use during execution of the application, new versions of objects, etc. Also, in some examples, the software includes a database with a plurality of records. Updates to the software may include additional records and/or changes to one or more existing records. Example databases that may be updated using DNS as described herein include, databases of operating system metadata, such as the LIBOSINFO maintained by Red Hat, Inc. of Raleigh, N.C. and anti-virus databases including virus definitions for download by client systems.

Figure 1:
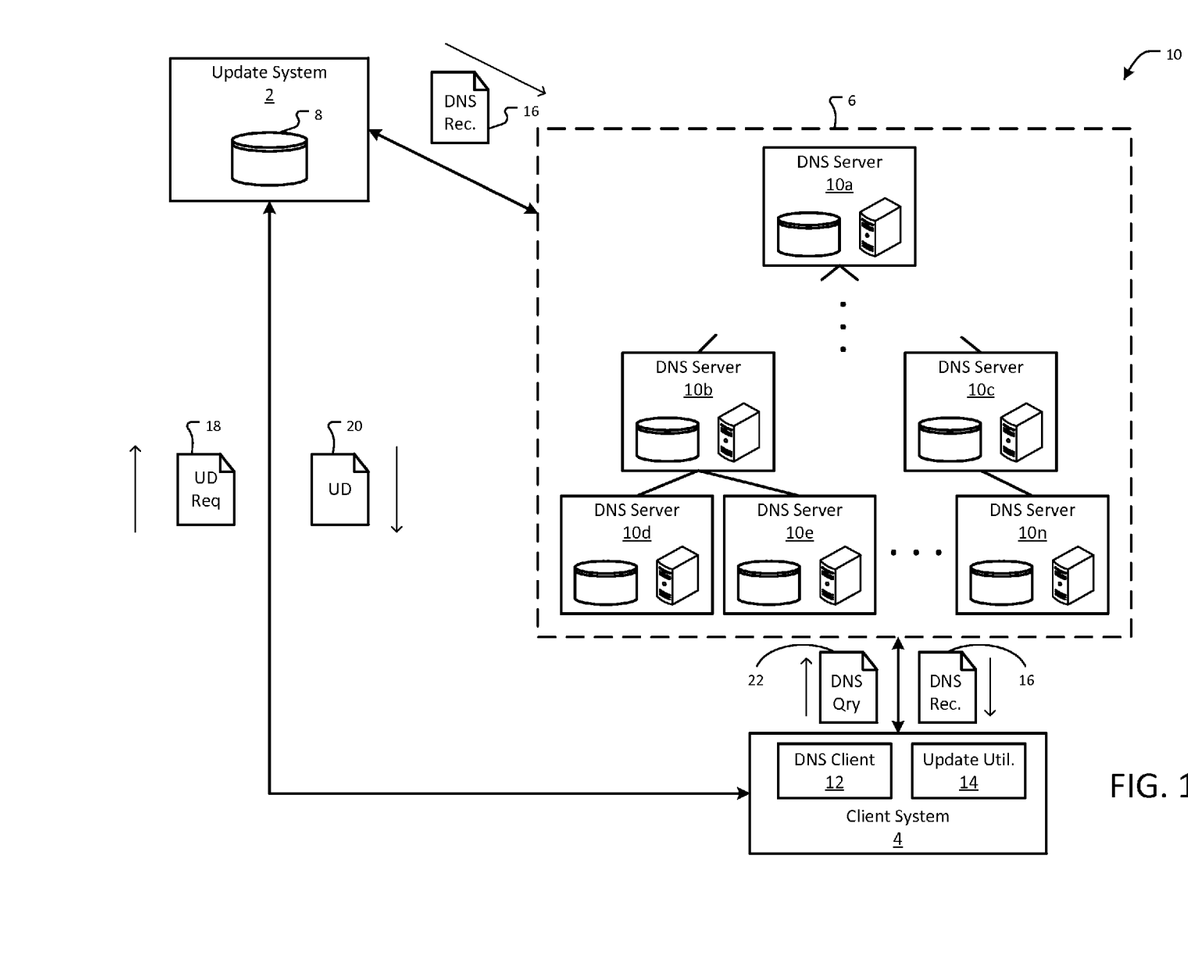
FIG. 1 is a diagram showing one example of an environment for updating software.

FIG. 1 is a diagram showing one example of an environment 10 for updating software. The environment 10 may comprise an update system 2, a client system 4 and a DNS system 6. The update system 2 may comprise any suitable type of computing device or machine that has a programmable processor including, for example, one or more servers, one or more desktop computers, one or more laptop computers, one or more routers, etc. The update system 2 may include a single computing device or multiple interconnected computing devices (e.g., multiple servers configured in a cluster). The update system may include a data store 8 that stores software updates, as described herein. The data store 8 may comprise any suitable type of data storage hardware such as, for example, disk drives, solid state storage hardware, etc.

A client system 4 may include any suitable computer system that utilizes the software updated by the update system 2. The client system 4 may also comprise any suitable type of computing device or machine having a programmable processor such as, for example, one or more servers, one or more desktop computers, one or more laptop computers, one or more routers, etc. Although one example client system 4 is shown in FIG. 1 and described, the environment 10 may comprise any suitable number of client systems similar to the client system 4. In some examples, the client system 4 may execute an update utility 14 and a DNS client 12. The update utility 14 may be programmed to determine when a new update is available at the update system 2 and download the new update. The DNS client 12 may be programmed to receive and respond to DNS queries, such as, for example, DNS queries received from the update utility 14. In some examples, the DNS client 12 may be omitted and its functionality incorporated into the update utility 14.

The DNS system 6 may comprise one or more DNS servers 10a, 10b, 10c, 10d, 10e, 10n. DNS servers 10a, 10b, 10c, 10d, 10e, 10n may communicate among one another to reply to DNS queries. DNS servers 10a, 10b, 10c, 10d, 10e, 10n may comprise any suitable type of computing device or machine having a programmable processor such as, for example, one or more servers, one or more desktop computers, one or more laptop computers, one or more routers, etc. Although six DNS servers 10a, 10b, 10c, 10d, 10e, 10n are shown in FIG. 1, DNS systems 6 may include any suitable number of DNS servers.

The various components 2, 4, 10a, 10b, 10c, 10d, 10e, 10n may be in communication with one another via a network. For example, FIG. 1 shows communication paths between the update system 2 and the DNS system 6, between the update system 2 and the client system 4, and between the client system 4 and the DNS system 6. These connections may be accomplished over the network (not otherwise shown). The network may be any suitable wired and/or wireless network and may comprise, for example, one or more local area networks (LANs), one or more wide area networks (WANs), one or more public networks such as the Internet, etc. In some examples, one or more of the components 2, 4, 10a, 10b, 10c, 10d, 10e, 10n may be directly connected to one another via a wired or wireless connection independent of the network.

Figure 2:
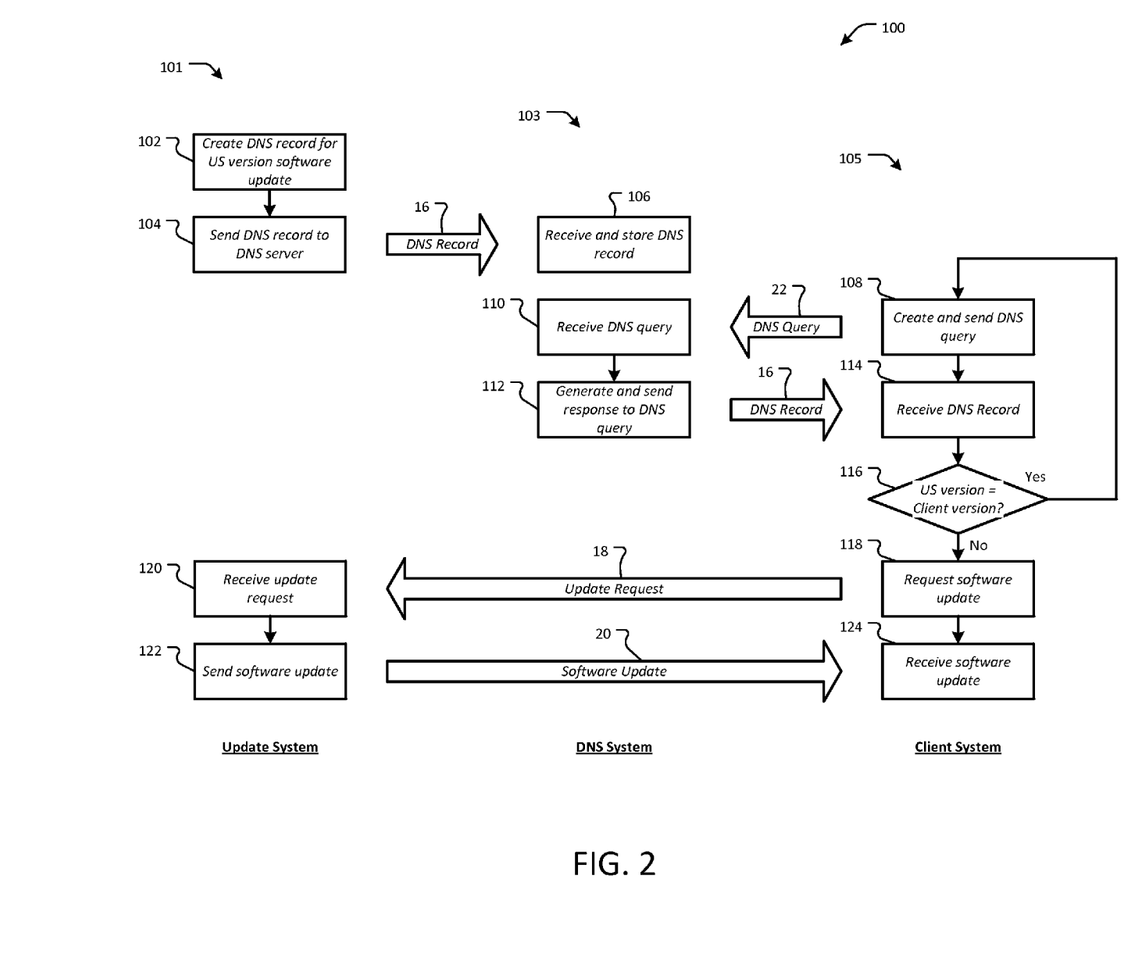
FIG. 2 is a flowchart showing one example of a process flow for updating software in the environment of FIG. 1.

FIG. 2 is a flowchart showing one example of a process flow 100 for updating software in the environment 10 of FIG. 1. The process flow 100 comprises three columns 101, 103, 105. Column 101 comprises actions performed by the update system 2. Column 103 comprises actions performed by the DNS system 6 and column 105 comprises actions performed by the client system 4. At 102, the update system 2 may create a DNS record 16 corresponding to a first update for updatable software. As described above, the software may be any suitable type of software including, for example, an application, a database, etc.

The DNS record 16 may comprise version data indicating a version of the first update, a valid time period for the DNS record 16, and an indication of a domain name associated with the first update. Version data may be any suitable data indicating a version of the first update stored at the update system 2. For example, the version data may comprise a numeric or alphanumeric version identifier, a checksum of a version identifier, a checksum of the version of the first update, a hash of the version identifier, a hash of the version of the first update, or any other suitable indicator of a version of the first update. The valid time period for the DNS record 16 may indicate a time period during which the version data in the DNS record 16 may be considered valid by client systems, such as 4. The valid time period may be utilized when the DNS record 16 is cached at various DNS severs 10a, 10b, 10c, 10d, 10e, 10n and/or the DNS client 12 to determine whether the DNS record 16 remains valid, or whether another DNS server 10a, 10b, 10c, 10d, 10e, 10n should be consulted to obtain a newer version of the DNS record 16. For example, the update system 2 may set the valid time period to expire at or before the next time that the update system 2 anticipates having a new version of the update. In some DNS systems 6, the valid time period may be indicated by a time-to-live value. In some examples, the update system 2 may digitally sign the DNS record 16 with its private key, as described herein. The domain name may uniquely identify the first update. The version data, valid time period, and domain name may be incorporated into the DNS record 16 in any suitable manner. In some examples, the DNS record 16 comprises a DNS zone file having various entries describing the DNS record 16 and/or the update, as described herein.

At 104, the update system 2 may send the DNS record 16 to a DNS system 6. For example, the update system 2 may send the DNS record 16 to a particular DNS server 10a of the DNS system 6. The server 10a receiving the DNS record 16 may be considered an authoritative name server for the DNS record 16. The DNS system 6 (e.g., the DNS server 10a) may receive the DNS record 16 at 106. At 108, the client system 4 may create and send a DNS query 22 requesting the DNS record 16. The DNS query 22 may comprise domain name data indicating the domain name associated with the first update. For example, an update utility 14 of the client system 4 may request the DNS record 16 from the DNS client 12 executing at the client system 4. The DNS client may send DNS query 22 to the DNS system 6. The DNS system 6 may receive the DNS query 22 at 110. At 112, the DNS system 6 may return to the client system 4 the DNS record 16 originally received at 106. The DNS system 6 may identify and return the DNS record 16 in any suitable manner.

In some examples, the DNS servers 10a, 10b, 10c, 10d, 10e, 10n may be arranged in a hierarchy. In the example, hierarchy shown in FIG. 1, DNS servers 10d, 10e, 10n may be at a first level of the hierarchy. DNS server 10b may be positioned at a second level of the hierarchy above servers 10d and 10e. DNS server 10c may be positioned also at the second level of the hierarchy above DNS server 10n. DNS server 10a may be positioned at a third level of the hierarchy above DNS servers 10b and 10c. Although three levels are shown in FIG. 1, the hierarchy may comprise any suitable number of levels. For example, the DNS system 6 may comprise additional levels of DNS servers (not shown) between the DNS servers 10b, 10c and the authoritative DNS server 10a. In one example, client system 4 may direct the DNS query 22 to a first level DNS server, such as 10e. The DNS server 10e may determine whether it has a valid copy of the DNS record 16. A valid copy of the DNS record 16 may be a copy having a valid time period that has not expired. If the DNS server 10e has a valid copy of the DNS record 16, the DNS server 10e may return the valid copy of the DNS record 16 to the client system 4. If the DNS server 10e does not have a valid copy of the DNS record 16, the DNS server 10e may request the DNS record 16 from a DNS server at the next level (e.g., DNS server 10b). The DNS server 10b may make the same determination. If the DNS server 10b has a valid copy of the DNS record 16, it may return that record to the DNS server 10d, which may, in turn, return the record to the client system 4. If the DNS server 10b does not have a valid copy of the DNS record 16, it may request the DNS record 16 from a higher level DNS server. This may continue until a queried DNS server has a valid copy of the DNS record 16. In some examples, each DNS server that has requested and received the DNS record 16 may keep a cache a copy of the DNS record 16 that may remain valid until the DNS record 16 valid time period has passed. In some examples, the DNS client 12 of the client system 4 may also maintain a cache copy of DNS records. When the DNS client 12 comprises a valid copy of the DNS record 16, it may return that copy to the update utility 14 and may not query the DNS system 6.

The client system 4 may receive the DNS record 16 at 114. At 116, the client system 4 (e.g., the update utility 14) may determine whether version data for the first update from the DNS record 16 matches version data for the first update at the client system 4. If the versions match, it may indicate that the version of the first update at the client system 4 matches the version available for download at the update system 2. Accordingly, the client system 4 may not request a download from the update system 2. After a delay (e.g., 1 hour, 1 day, etc.), the client system 4 may return to 108 and send another DNS query to determine if a new version of the first update is available. The delay may be determined, for example, by a developer, administrator, or other actor associated with the client system 4. If the version data compared at 116 does not match, it may indicate that the version of the first update available at the update system 2 does not match the version at the client system 4. Accordingly, the client system 4 (e.g., the update utility 14) may send an update request 18 to the update system 2. The update system 2 may receive the update request 18 at 120 and at 122, the update system 2 may send the first update 20 to the client system 4. The client system 4 (e.g., the update utility 14) may receive the first update 20 at 124. In some examples, the client system 4 may utilize the first update 20 to replace another version of the first update (not shown) that had been previously used by the client system 4.

Figure 3:
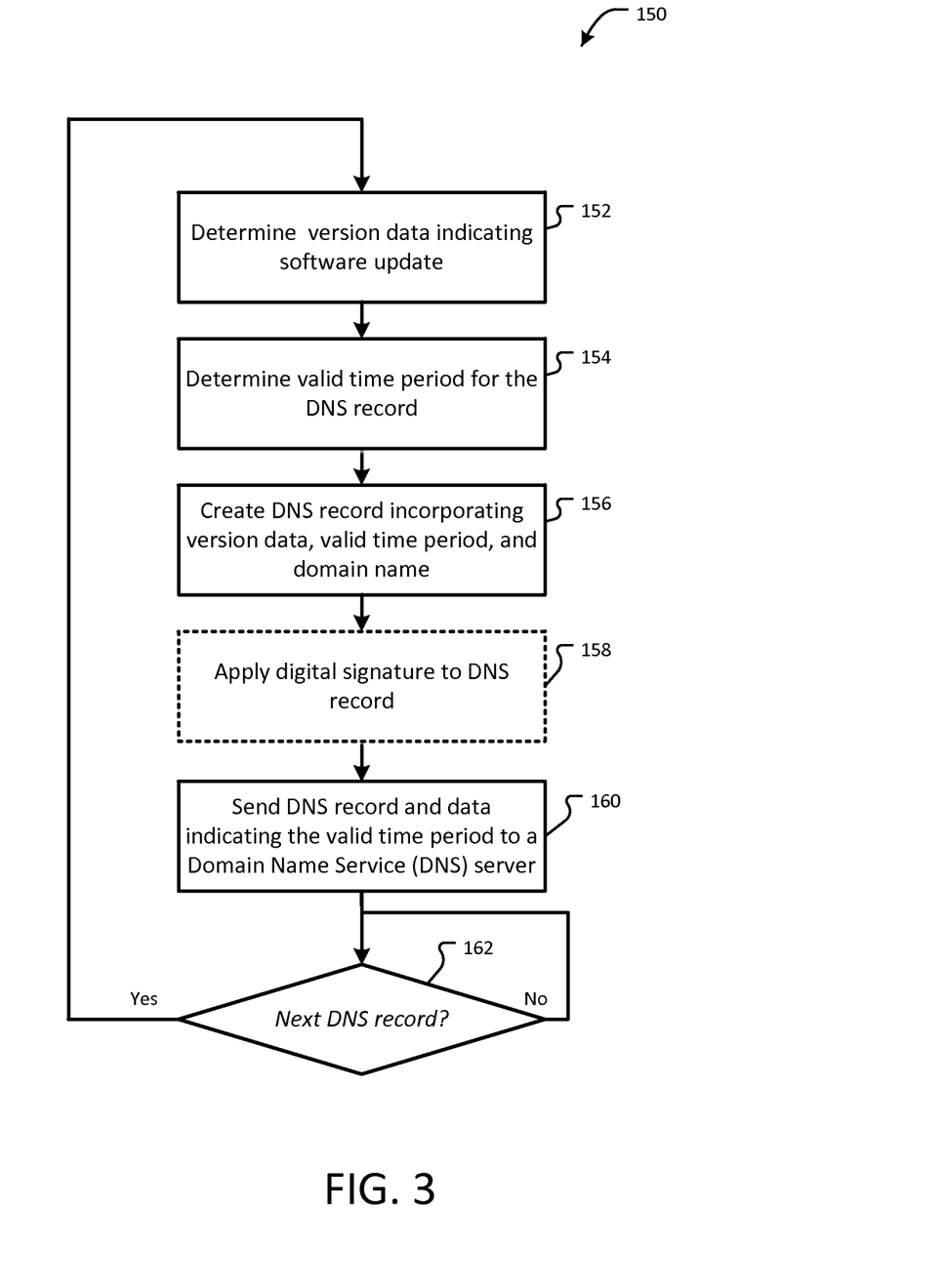
FIG. 3 is a flow chart showing one example of a process flow that may be executed by the update system of FIG. 1 to generate a DNS record for the first software update.

FIG. 3 is a flow chart showing one example of a process flow 150 that may be executed by the update system 2 to generate a DNS record 16 for the first software update. At 152, the update system 2 may determine version data indicating a version of the first software update available at the update system 2. Generating the version data may include, for example, querying the data store 8 to retrieve a version of the first update that is stored at the data store 8. In some examples, the process flow may execute when a new version of the first update is received at the data store 8 and a request for execution of the process flow 150 may include an indication of the version of the first update stored at the data store 8.

At 154, the update system 2 may determine a valid time period for the DNS record 16 to be created. The valid time period may be determined in any suitable manner. In some examples, the valid time period may be set to expire at or near a time when the next version of the first update is expected to be available at the data store 8. For example, if the first update is modified about once a week, the valid time period may be set to one week. Any other suitable parameter may be used to set the valid time period. In some examples, the update system 2 may review the dates when previous versions of the first update became available at the data store 8. The valid time period may be set to an average time between versions of the first update.

At 156, the update system 2 may create the DNS record 16 incorporating the version data, the valid time period, and the domain name. In some examples, creating the DNS record 16 may include generating a DNS zone file comprising one or more resource records. Resource records may be of different types depending on the format and syntax of the DNS utilized. Version data may be stored at any suitable resource record. In some examples, version data for the DNS record 16 may be stored at a TXT type resource record configured to contain text data associated with the domain name. The DNS record 16 may include various other information regarding the update such as, for example, the domain name for the update an a valid time period for the DNS record 16. An example syntax for a zone file is provided below:

```
; zone file for updates.software_company.com
$TTL 7d
$ORIGIN updates.software_company.com
@           IN      A     10.0.0.1
app_one     IN      TXT   "version 1"
```

In the example zone file, TTL refers to "time-to-live." The TTL for the example zone file is 7 d or seven days, indicating that the valid time period for the DNS record 16 is seven days. The time-to-live may be measured from the time that the DNS record 16 is received. For example, when a DNS server or client receives the DNS record 16, it may record a timestamp indicating the time of receipt. If more than the time-to-live has passed since the time stamp, the DNS record 16 may be considered invalid. The example zone file includes a $ORIGIN field indicating the domain name of the update system 2, which in the example above is "updates.software_company.com." Any suitable domain name may be used, for example, the domain name may be owned by the company or other entity that originated or maintains the software. The first resource record of type IN may provide the IPv4 address of the update system 2. The example zone file also indicates a resource record of the type TXT for a first application or software package called "app_one." This resource record indicates an alphanumeric version indicator (i.e., "version 1"). This may indicate that a version of the first update for "app_one" stored at the update system 2 is called "version 1". The complete DNS record name for the application updates combines the $ORIGIN to form "app_one.updates.software_company.com".

Optionally, at 158, the update system 2 may digitally sign the DNS record 16. For example the update system 2 may comprise a public and private key pair. In some examples, the public key may be registered with a certificate authority. The certificate authority may, subsequently, verify to third parties (e.g., client systems 4) that the public key is associated with the update system 2. The update system 2 may digitally sign the DNS record 16 by encrypting it with the update system's private key. When a client system 4 receives the encrypted DNS record 16, it may decrypt the DNS record 16 with the update system's public key. This may indicate that the DNS record 16 did, indeed, originate from the update system 2 and was not surreptitiously created by another party. In some examples, the update system 2 may digitally sign the DNS record 16 and/or take other actions to secure the DNS record 16 according to Domain Name System Security Extensions (DNSSEC) specifications. At 160, the update system 2 may send the created DNS record 16 to a DNS server, such as the DNS server 10a as described above.

At 162, the update system 2 may determine whether a new DNS record should be generated. The update system 2 may determine that a new DNS record should be generated in various circumstances. For example, the update system 2 may be programmed to execute the process flow 150 periodically. For example, the update system 2 may generate a DNS record 16 with a valid time period, such that the DNS record 16 expires as described herein. The update system 2 may be programmed to generate a new DNS record (e.g., by returning to 152) at or before the expiration of the valid time period of the previous DNS record 16. Also, in some examples, the update system 2 may be programmed to generate a new DNS record (e.g., by executing the process flow 150) when a new version of the first update is received at the data store 8. For example, the if a second version of the first update becomes available at the update system 2, the update system 2 may be configured to generate a second DNS record with second version data indicating the second version of the update.

Figure 4:
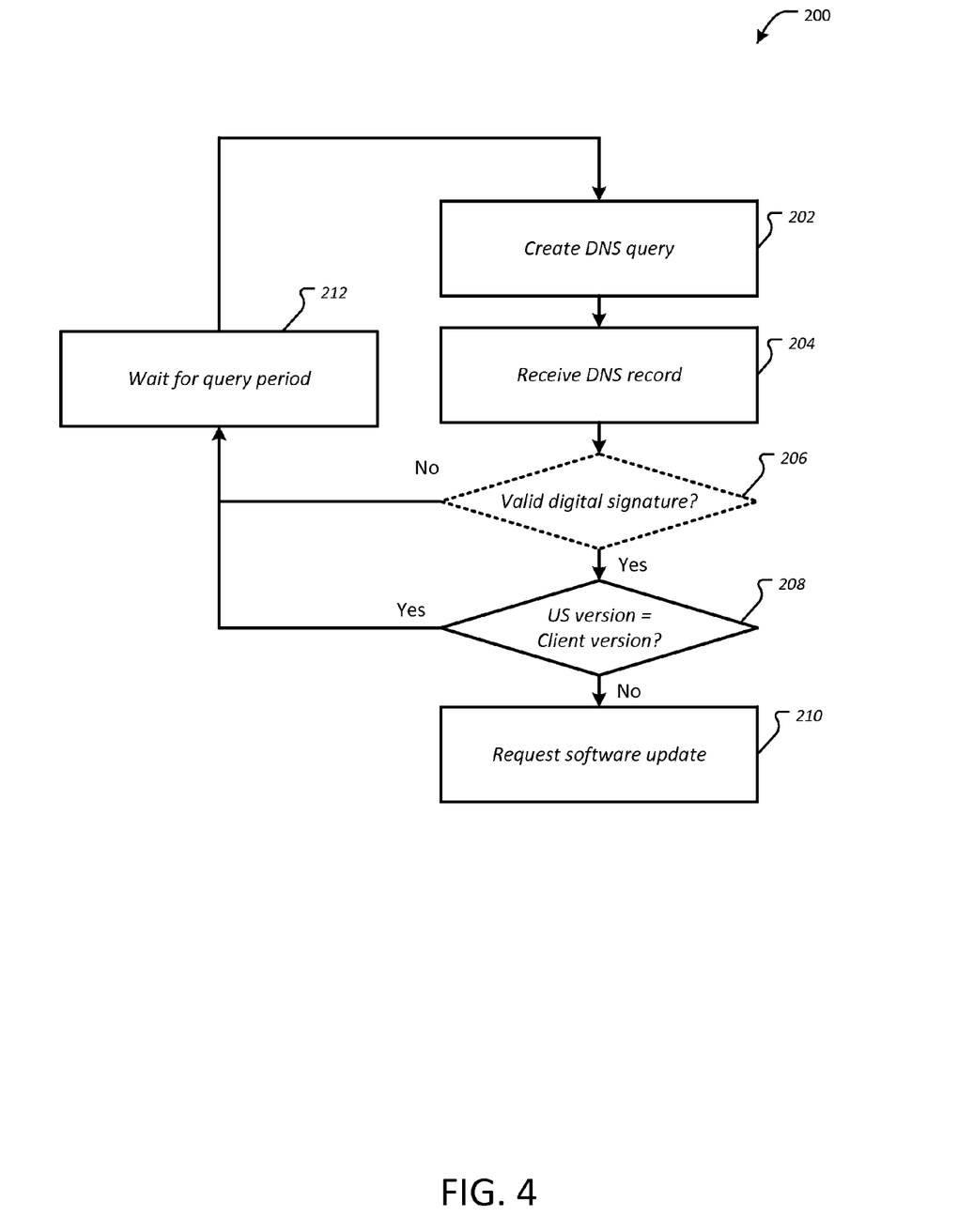
FIG. 4 is a flow chart showing one example of a process flow that may be executed by the client system to monitor the first update and receive new versions, when available.

FIG. 4 is a flow chart showing one example of a process flow 200 that may be executed by the client system 4 (e.g., the update utility 14 and/or the DNS client 12) to monitor the first update and receive new versions, when available. Although the actions of the process flow 200 are described indicating example components of the client system 4 that may perform the actions, the client system 4 may be constituted in any suitable way. Accordingly, in some examples, components of the client system 4 other than those indicated may perform the actions 202, 204, 206, 208, 210, 212 described herein.

At 202, the client system 4 (e.g., the update utility 14) may request the version of the first update available at the update system 2 (e.g., an update system version). Making the request may involve sending a DNS query 22 to the DNS client 12. Also, in some examples, making the request at 202 may involve sending a request to the DNS client 12 that is not formatted as a DNS query 22. For example, the DNS client 12 may receive the request, generate a DNS query 22 and direct the DNS query 22 to the DNS system 6, as described herein. Also, if the DNS client 12 has a cached copy of the DNS record 16 that is valid, it may provide that copy to the update utility 14 without accessing the DNS system 6.

At 204, the client system 4 (e.g., the update utility 14) may receive the DNS record 16. The DNS record 16 may be located and provided to the client system 4 in any suitable manner by the DNS client 12 and/or the DNS system 6, as described herein. Optionally, at 206, the client system (e.g., update utility 14) may verify a digital signature of the DNS record 16. For example, the client system 4 my decrypt the DNS record 16, or a portion thereof, with a public key associated with the update system 2 (e.g., by a certificate authority, as described herein). If the DNS record 16 can be decrypted with the public key of the update system 2, it may indicate a valid digital signature.

At 206, the client system 4 may determine, as described herein, whether the version data describing the version of the first update available at the update system 2 matches version data describing the version of the first update currently at the client system 4. For example, when the DNS record 16 is or comprises a zone file, the client system 4 may identify a resource record from the zone file corresponding to the first update. Version data may be included in the identified resource record. If the there is a match, it may indicate that the client system 4 already has the version of the first update available from the update system 2. Accordingly, the client system 4 may, at 212, wait for a query period and then proceed again to 202. The query period at 212 may be any suitable period set by an administrator of the client system 4 such as, for example, 1 hour, 1 day, 1 week, etc. In some examples, because the client system 4 requests the DNS record 16 instead of directly querying the update system 2 for the available version of the first update, the query period selected by the client system 4 (and by other client systems in the environment 10) may not affect the operation of the update system 2.

If the version data describing the version of the first update available at the update system 2 does not match the version data describing the version of the first update currently at the client system 4, it may indicate that the client system 4 does not have the version of the first update available at the update system 2 (e.g., a newer version). Accordingly, the client system 4 (e.g., the update utility 14) may request from the update system 2 the update system's version of the first update. The first update may be received in any suitable form. In some examples, the first update may be received as a complete version of an application. In some examples, the update may be received as a patch, executable or otherwise, to be applied to an application in use at the client system 4. In some examples, where the software is a database, the database may be stored as a set of eXtensible Markup Language (XML) files. The first update, then, may be received as a compressed file including one or more XML files. For example, the XML files received with the first update may include files that have changed relative to a baseline state of the database. The baseline state may be an original state of the database or a state of the database relative to the last version of the first updated received by the client system 4.

Figure 5:
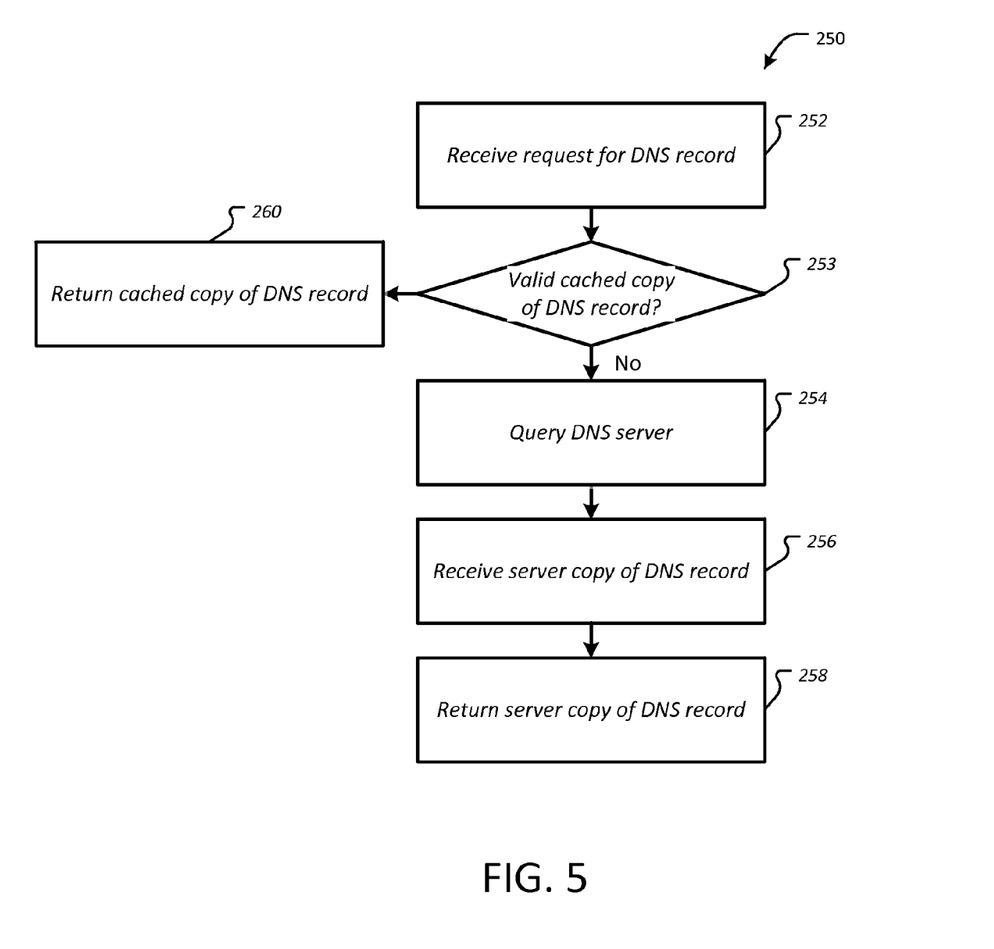
FIG. 5 is a flow chart showing one example of a process flow that may be executed by a DNS client of a client system to obtain a DNS record for a software update.

FIG. 5 is a flow chart showing one example of a process flow 250 that may be executed by the DNS client 12, for example, to obtain the DNS record 16. At 252, the DNS client 12 may receive a request for the DNS record 16, for example, from the update utility 14. In some examples, the request may be formatted as a DNS query 22. At 253, the DNS client 12 may determine whether a valid copy of the DNS record 16 is stored at the client system 4 (e.g., at a cache memory associated with the DNS client 12). If a valid copy is stored at the client system 4, the DNS client 12 may return the valid copy of the DNS record 16 to the update utility 14 at 260. If no valid copy is stored at the client system 4, the DNS client 12 may, at 254, query the DNS system 6 for the DNS record 16, for example, as described herein. At 256, the DNS client 12 may receive a valid copy of the DNS record 16 from the DNS system 6. The received copy of the DNS record 16 may be returned to the update utility 14 at 258.

In some examples, a single domain name and DNS record, such as DNS record 16, may be used to communicate available versions of multiple updates and multiple software packages (e.g., applications, databases, etc. For example, a DNS record corresponding to multiple updates may be or comprise a zone file such as the example below:

```
; zone file for updates.software_company.com
$TTL 7d
$ORIGIN updates.software_company.com
@             IN    A      10.0.0.1
app_one_1     IN    TXT    "version 1.3.6"
app_one_2     IN    TXT    "version 2.4.2"
app_one_3     IN    TXT    "version 3.1.0"
app_two_8     IN    TXT    "version 8.0.1"
app_three_5   IN    TXT    "version 5.4.2"
app_three_6   IN    TXT    "version 6.2.1"
```

This example zone file describes updates available to three different applications, referred to as "app_one," "app_two," and "app_three." The first application, "app_one" has three maintained releases ("app_one_1," "app_one_2" and "app_one_3). The second application, "app_two," has only one maintained release ("app_two_8"). The third "app_three," has two maintained releases ("app_three_5" and "app_three_6"). The application releases each have a resource record in the example zone file of type TXT that indicates the version of an update for the application release stored at the update system 2. In the example above, the application name and version are conjoined into single alphanumeric strings (e.g., "app_one_1" indicates both the update for version 1 of the application "app_one"), although any suitable syntax may be used. In some examples, a client system 4 may update a single application release by requesting a DNS record including the entire zone file, or requesting a portion thereof. For example, if the client system 4 has "app_three," release 6 installed, it may request DNS zone "app_three_6.updates.software_company.com." In response, the client system may receive the resource record for "app_three," release 6 including the version of the update for that release stored at the update system 2. The TTL or time-to-live for the example zone file is again 7 d or seven days, indicating that the valid time period for the DNS record is seven days from receipt. In some examples, each of the updates described by the zone file may have the same valid time period. The update system 2 may set the valid time period accordingly. For example, the valid time period may be set to be at or before a next time that a new version is expected for any one of the three updates.

Reference in the specification to, "examples," "various examples," "some examples," etc. means that a particular feature, structure, or characteristic described in connection with the example embodiments is included in at least one embodiment of the invention. The appearances of the above-referenced phrases in various places in the specification are not necessarily all referring to the same embodiment. Reference to embodiments is intended to disclose examples, rather than limit the claimed invention. While the invention has been particularly shown and described with reference to several embodiments, it will be understood by persons skilled in the relevant art that various changes in form and details can be made therein without departing from the spirit and scope of the invention.

It should be noted that the language used in the specification has been principally selected for readability and instructional purposes, and may not have been selected to delineate or circumscribe the inventive subject matter. Accordingly, the present disclosure is intended to be illustrative, but not limiting, of the scope of the invention.

It is to be understood that the figures and descriptions of example embodiments of the present disclosure have been simplified to illustrate elements that are relevant for a clear understanding of the present disclosure, while eliminating, for purposes of clarity, other elements, such as for example, details of system architecture. Those of ordinary skill in the art will recognize that these and other elements may be desirable for practice of various aspects of the present examples. However, because such elements are well known in the art, and because they do not facilitate a better understanding of the present disclosure, a discussion of such elements is not provided herein.

It is to be understood that the figures and descriptions of example embodiments of the present disclosure have been simplified to illustrate elements that are relevant for a clear understanding of the present disclosure, while eliminating, for purposes of clarity, other elements, such as for example, details of system architecture. Those of ordinary skill in the art will recognize that these and other elements may be desirable for practice of various aspects of the present examples. However, because such elements are well known in the art, and because they do not facilitate a better understanding of the present disclosure, a discussion of such elements is not provided herein.

In some examples of the present methods and systems disclosed herein, a single component can be replaced by multiple components, and multiple components replaced by a single component, to perform a given command or commands. Except where such substitution would not be operative to practice the present methods and systems, such substitution is within the scope of the present disclosure. Examples presented herein, including operational examples, are intended to illustrate potential implementations of the present method and system examples. Such examples are intended primarily for purposes of illustration. No particular aspect or aspects of the example method, product, computer-readable media, and/or system examples described herein are intended to limit the scope of the present disclosure.

The various components of the environment 10 may be and/or are executed by any suitable type of computing device including, for example, desktop computers, laptop computers, mobile phones, palmtop computers, personal data assistants (PDAs), etc. As used herein, a "computer," "computer system," "computer device," or "computing device," "machine," may be, for example and without limitation, either alone or in combination, a personal computer (PC), server-based computer, main frame, server, microcomputer, minicomputer, laptop, personal data assistant (PDA), cellular phone, pager, processor, including wireless and/or wireline varieties thereof, and/or any other computerized device capable of configuration for processing data for standalone application and/or over a networked medium or media. Computers and computer systems disclosed herein may include operatively associated memory for storing certain software applications used in obtaining, processing, storing, and/or communicating data. Such memory can be internal, external, remote, or local with respect to its operatively associated computer or computer system. Memory may also include any means for storing software or other instructions including, for example and without limitation, a hard disk, an optical disk, floppy disk, ROM (read-only memory), RAM (random-access memory), PROM (programmable ROM), EEPROM (extended erasable PROM), and/or other like computer-readable media.

Some portions of the above disclosure are presented in terms of methods and symbolic representations of operations on data bits within a computer memory. These descriptions and representations are the means used by those skilled in the art to most effectively convey the substance of their work to others skilled in the art. A method is here, and generally, conceived to be a sequence of actions (instructions) leading to a desired result. The actions are those requiring physical manipulations of physical quantities. Usually, though not necessarily, these quantities take the form of electrical, magnetic, or optical signals capable of being stored, transferred, combined, compared, and otherwise manipulated. It is convenient at times, principally for reasons of common usage, to refer to these signals as bits, values, elements, symbols, characters, terms, numbers, or the like. Furthermore, it is also convenient at times, to refer to certain arrangements of actions requiring physical manipulations of physical quantities as modules or code devices, without loss of generality. It should be borne in mind, however, that all of these and similar terms are to be associated with the appropriate physical quantities and are merely convenient labels applied to these quantities. Unless specifically stated otherwise as apparent from the preceding discussion, throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission, or display devices.

Certain aspects of the present disclosure include process steps and instructions described herein in the form of a method. It should be noted that the process steps and instructions of the present disclosure can be embodied in software, firmware, or hardware, and when embodied in software, can be downloaded to reside on and be operated from different platforms used by a variety of operating systems.

The present disclosure also relates to an apparatus for performing the operations herein. This apparatus may be specially constructed for the required purposes, or it may comprise a general-purpose computer selectively activated or reconfigured by a computer program stored in the computer. Such a computer program may be stored in a computer-readable storage medium, such as, but is not limited to, any type of disk including floppy disks, optical disks, CD-ROMs, magnetic-optical disks, read-only memories (ROMs), random-access memories (RAMs), electrically-programmable read-only memories (EPROMs), electrically erasable programmable read-only memories (EEPROMs), magnetic or optical cards, application-specific integrated circuits (ASICs), or any type of media suitable for storing electronic instructions, and each coupled to a computer system bus. Furthermore, the computers and computer systems referred to in the specification may include a single processor or may be architectures employing multiple processor designs for increased computing capability.

The methods and systems presented herein, unless indicated otherwise, are not inherently related to any particular computer or other apparatus. Various general-purpose systems may also be used with programs in accordance with the teachings herein, or it may prove convenient to construct more specialized apparatus to perform the disclosed method actions. The structure for a variety of these systems will appear from the above description. In addition, although some of the examples herein are presented in the context of a particular programming language, the present disclosure is not limited to any particular programming language. A variety of programming languages may be used to implement the teachings of the present disclosure as described herein, and any references above to specific languages are provided for disclosure of enablement and best mode of the present disclosure.

The term "computer-readable medium" as used herein may include, for example, magnetic and optical memory devices such as diskettes, compact discs of both read-only and writeable varieties, optical disk drives, and hard disk drives. A computer-readable medium may also include non-transitory memory storage that can be physical or virtual.

I claim:
1. A system for updating a database, the system comprising:
   a Domain Name System (DNS) server;
   an update system separate from and in communication with the DNS server; and
   a client system separate from and in communication with the update system and the DNS server, the client system storing version data indicating a current client update to the database,
   wherein the update system comprises at least one processor and operatively associated memory, and wherein the update system is programmed to:
      generate a resource record comprising new version data indicating a new version of an update to the database is available at the update system;
      write the resource record to a zone file corresponding to a domain name;
      write, to the zone file, time-to-live data for the resource record before sending the zone file to the DNS server, wherein the time-to-live data indicates a valid time period for the resource record; and
      send the zone file to the DNS server; and
   wherein the client system comprises at least one processor and operatively associated memory, and wherein the client system is programmed to:
      send, to the DNS server, a DNS query comprising domain name data indicating the domain name;
      in response to the DNS query, receive the zone file from the DNS server after the zone file was sent from the update system to the DNS server;
      in response to receiving the zone file, determine that the valid time period indicated by the time-to-live data from the zone file has not expired;
      in response to the determination that the valid time period has not expired, determine that the new version data does not match the client version data;
      in response to the determination that the new version data does not match the client version data, send to the update system a request for the new version of the update to the database; and in response to the request for the new version of the update, receive, from the update system, the new version of the update to the database.

2. The system of claim 1, wherein the client system includes a DNS client programmed to:
receive the DNS query;
determine that a memory location associated with the DNS client does not comprise a valid copy of the zone file corresponding to the domain name; and
send the DNS query to the DNS server; and
wherein the DNS server is programmed to:
receive the DNS query from the DNS client;
determine that a memory location associated with the DNS server comprises the zone file;
determine that the valid time period indicated by the time-to-live data from the zone file has not expired; and
send the zone file to the DNS client.

3. The system of claim 1, wherein the database comprises a plurality of records, and wherein the update comprises database replacement data to replace at least one of the plurality of records.

4. The system of claim 1, wherein the resource record is a TXT resource record.

5. The system of claim 1, wherein the client system periodically determines whether the new version data indicating a new version of an update to the database that is different from the client version data stored at the client system is available at the update system by sending a periodic DNS query to the DNS server.

6. The system of claim 1, wherein the database is not the DNS database itself.

7. The system of claim 1, wherein the database is database of operating system metadata.

8. The system of claim 1, wherein the database is an anti-virus database.

9. A method for updating software, the method comprising:
sending, by a client system and to a domain name system (DNS) server, a DNS query, the DNS query comprising domain data indicating a domain name associated with a new software update;
receiving, by the client system, in response to the DNS query, a DNS record comprising new version data indicating a version of a new update to the software, wherein the DNS record is associated with data indicating a valid time period for the new update to the software;
in response to receiving the DNS record, determining, by the client system, that the valid time period for the new update to the software has not expired;
in response to the determination that the valid time period has not expired, determining, by the client system, that the new version data is not equivalent to client version data stored at the client system, the client version data indicating a version of a current update to the software at the client system;
in response to the determination that the new version data is not equivalent to the client version data, sending, by the client system and to an update system, separate from and in communication with the client system and the DNS server, a request for the new update to the software; and
in response to the request for the new update to the software, receiving, by the client system and from the update system, the new update to the software,
wherein the client system sends the DNS query to the DNS server after the DNS record was sent from the update system to the DNS server.

10. The method of claim 9, wherein the client system sends the DNS query to a DNS client executing at the client system before sending the DNS query to the DNS server.

11. The method of claim 10, further comprising:
determining, by the DNS client, that no valid copy of the DNS record is stored at the client system;
sending, by the DNS client, the DNS query to the DNS server;
receiving, by the DNS client and from the DNS server, the DNS record; and
returning, by the DNS client, the DNS record.

12. The method of claim 9, further comprising determining that a digital signature of the DNS record matches a public key of the update system.

13. The method of claim 9, wherein the software comprises a database, the database comprising a plurality of records, and wherein the new update comprises a modification to a first record of the plurality of records.

14. The method of claim 9, wherein the DNS record comprises a zone file, further comprising:
identifying in the zone file a resource record corresponding to the new update;
and reading the new version data from the resource record.

* * * * *

UNITED STATES PATENT AND TRADEMARK OFFICE
CERTIFICATE OF CORRECTION

PATENT NO.         : 9,977,667 B2
APPLICATION NO.    : 14/849272
DATED              : May 22, 2018
INVENTOR(S)        : Berrange It is certified that error appears in the above-identified patent and that said Letters Patent is hereby corrected as shown below:

In the Claims

In Column 13, Line 32 (Claim 7), replace "database is database" with --database is a database--.

Signed and Sealed this
Tenth Day of July, 2018

Andrei Iancu
*Director of the United States Patent and Trademark Office*